United States Patent Office 3,504,151
Patented Mar. 31, 1970

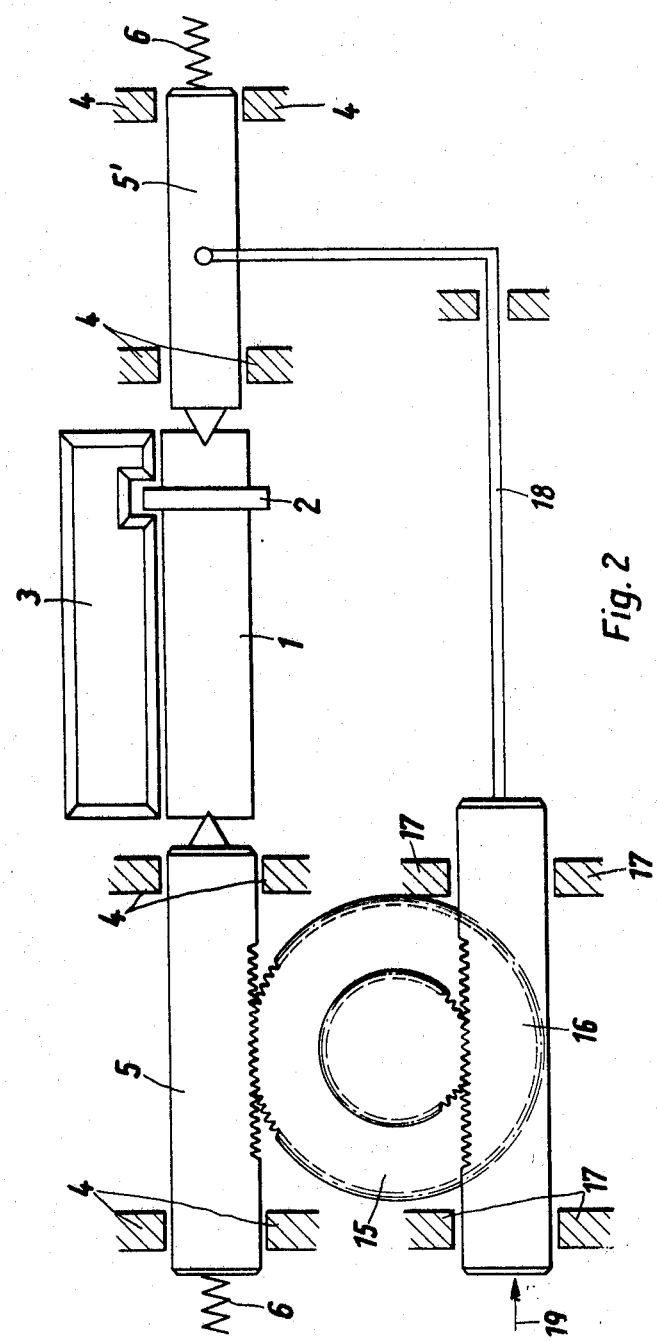

3,504,151
APPARATUS AND METHOD OF INDUCTIVELY HEATING ELONGATED WORKPIECES
Friedhelm Reinke, Remscheid, and Edgar Stengel, Wuppertal-Hahnerberg, Germany, assignors to AEG-Elotherm G.m.b.H., Remscheid-Hasten, Germany
Filed Feb. 19, 1968, Ser. No. 706,397
Claims priority, application Germany, May 20, 1967, A 55,765; Aug. 16, 1967, A 56,503
Int. Cl. H05b 5/00, 9/06
U.S. Cl. 219—10.57
7 Claims

ABSTRACT OF THE DISCLOSURE

Apparatus for inductively heating elongate workpieces, such as cam shafts, includes holding centres for gripping the opposite ends of the workpiece, the centres being spring biased toward each other, and inductor means for inductively heating the workpieces. The centres are interconnected by a rack and pinion arrangement which effects simultaneous movement of the centres toward or away from each other. The movement may be differential so that a selected portion of a workpiece may be held stationary even though thermal expansion of the workpiece would otherwise result in axial displacement of that portion.

---

Figure 1:
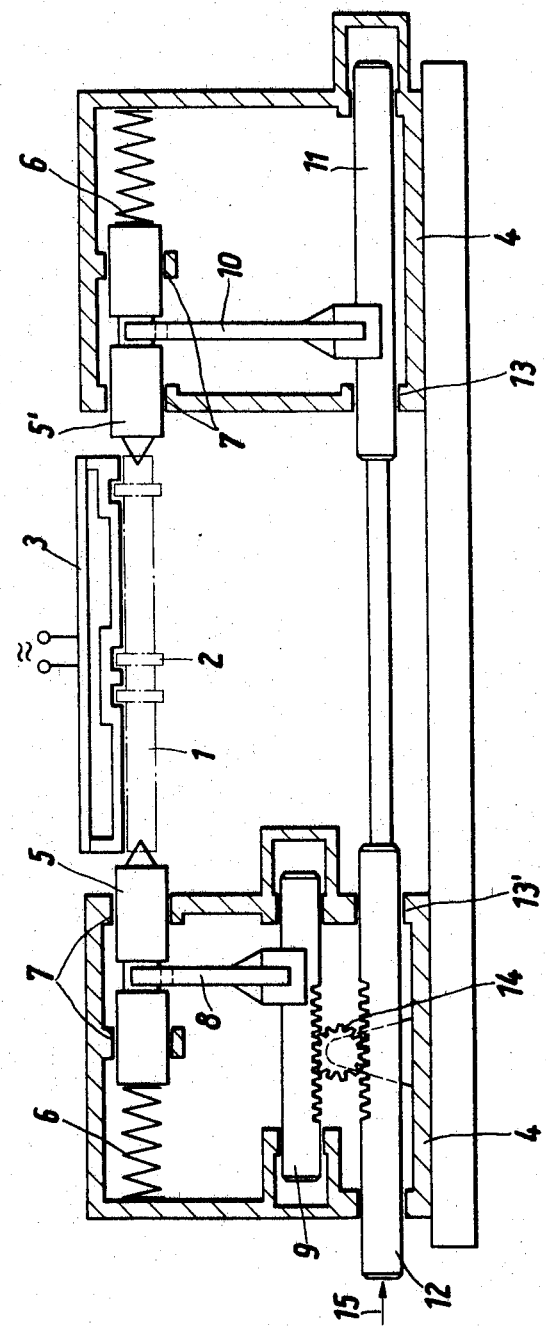

The application relates to the inductive surface hardening of elongate workpieces, and particularly relates to inductive surface hardening to provide in exactly defined locations of the workpiece alternate hardened and unhardened zones. The invention is particularly applicable to elongate workpieces which possess abrupt changes in diameter along their length. Such workpieces include for instance camshafts for internal combustion engines or axle shafts for motor vehicles.

A known process of surface-hardening such workpieces consists in inductively heating their surface to a given depth and then quenching them, for instance by immersion in a bath or exposure to the quenching spray of a spraying device. It is also known that during such a process the workpieces must be firmly located by clamping them between centres of which one is fixed and the other movable in the direction of the workpiece axis. Generally several pairs of centres may be provided in a workholding arrangement, disposed for instance on a spider which permits the workpieces to be programmed to move from one treating station to the next.

This procedure has proved to be satisfactory for inductively hardening workpieces not exceeding a given size, and it may also be applied with satisfactory results to workpieces of greater length provided the demands made upon uniformity and the accuracy of location of the hardened zones are not excessively stringent. However with increasing length of the workpieces good results are no longer attainable.

When long workpieces are inductively hardened, the expansion of the workpiece at the high temperature of inductive heating is in only one direction due to the fixed location of one end of the workpiece, and may sufficiently differ between workpieces of different lengths or of the same length to prevent reproducible results from being achieved. More particularly at the end of the workpiece remote from the fixed centre, the location of the boundary of the heated zone may vary from workpiece to workpiece by as much as several millimetres. Elevations such as cams at this end of a number of workpieces may therefore be displaced so as to come into contact with the inductor owing to their imprecise location, and the inductor may thus be damaged. Another disadvantage is the undesirable possible change of the width of the coupling gap between the inductor and one side of a cam at the expense of the other side of the said cam, since this also results in uneven inductive heating and hence uneven hardening of the cam. In view of current high quality requirements of surface-hardened workpieces used in automotive engines and in motor vehicles, such shortcomings must be eliminated or reduced, and it is therefore an object of the invention to provide apparatus and a method for inductively surface heating workpieces which meet these demands.

The invention consists of apparatus for inductively heating an elongate workpiece, which comprises workpiece holding centres mounted so as to be movable away from and towards each other and biased for movement towards each other to grip the workpiece in a heating position, and inductor means for inductively heating an elongate workpiece thereby gripped.

The said two centres are preferably mounted to yield against the resistance of compression springs. In a particular embodiment of the invention, each centre is mechanically rigidly connected to a rack movable parallel to the axis of the said centres, the two racks being coupled for simultaneous and oppositely-directed longitudinal movement through an interposed pinion on a fixed axle intercalating with the said racks, one rack being associated with drive means for movement thereof.

By the provision of centres both of which are capable of yielding longitudinal movement according to the invention, the workpiece may expand evenly in both axial directions under the influence of heat, so that the centre of the workpiece remains below the inductor centre. Furthermore thermal expansion effects on the workpiece during the process of inductive heating will be only half as great in relation to the inductor compared with the effects produced with an inductor held by centres, one of which is fixed. The quality of the surface-hardened elongated workpieces can thus be substantially improved by this simple expedient.

In some workpieces, while it may not be necessary to prevent the geometric centre of the workpiece from shifting in relation to the inductor as a result of thermal expansion, it may nevertheless be necessary for a relatively narrow zone off centre of the length of the workpiece and which may be located at any point along the length of the workpiece, for instance a workpiece portion having an increased diameter, to be stationary with respect to the inductor, for example situate at a distance of one third of its length from one end of the workpiece.

In a modification of the apparatus according to the invention this may be achieved by coupling the racks for simultaneous and oppositely-directed longitudinal movement through two or more pinions providing a gear ratio which corresponds to the ratio of the lengths of the portions of the workpiece extending in each direction from the surface zone that is to be kept stationary with respect to the inductors. The said pinions may comprise two pinions of appropriate gear ratio mounted fixedly on a common axle.

Embodiments of the invention are hereinafter described and illustrated in the accompanying drawings, of which FIGURES 1 and 2 are each a schematic representation of a longitudinal elevation of one of the said embodiments.

Referring to FIGURE 1, a workpiece 1 has cam surfaces one of which is shown at 2, along its length. A heating inductor 3 extending the entire length of the workpiece is shaped to conform with the elevations of the said cam surfaces. Both ends of the workpiece are firmly held between workholding means each comprising a casing 4 and a centre 5. Each centre is yieldably mounted in the casing against the resistance of a compression spring 6. Moreover, each centre 5 and 5' is reciprocably horizontally displaceable in the direction of the longitudinal axis of the workpiece, in guide means 7, each centre being connected by rod means to a rack. Thus rod 8 is connected between the centre 5 and associated rack 9, whereas the centre 5' is connected by the combination of vertical rod 10 and horizontal rod 11, to the associated rack 12. The horizontal rod 11 is movable in a horizontal direction, in slide bearings 13 and 13' for this rod, whereby a corresponding horizontal movement is imparted to rod 11. A single pinion 14 is mounted on a fixed pin and intercalates with both rack 9 and 12.

The arrangement illustrated in FIGURE 1 functions as follows: When an axial thrust in the direction of arrow 15 is applied to the rack 12, the two centres 5 and 5' move apart from each other against the resistance of their associated compression springs 6, and thus release the workpiece 1. Conversely the said centres are biased for movement towards each other by the compressive force of the springs 6, and thus in their normal position grip a workpiece mounted between the said centres.

FIGURE 2 illustrates a modified arrangement for heat treating a surface zone located towards one end of a workpiece.

In FIGURE 2, a workpiece 1 has a surface zone 2 consisting of a ring of larger diameter than the rest of the workpiece, located in a position dividing the length of the workpiece in a ratio of 1:3. During heating it is required that the said ring should not change its position in relation to the heating inductor as a result of expansion of the workpiece during heating. To this end the workpiece is mounted between two centres 5 and 5' which are coupled by a pinion arrangement as hereinafter described. The centres 5 and 5' are adapted to yield horizontally in their bearings 4 against the resistance of springs 6. The centre 5 is provided with a rack which co-operates with two pinions 15 mounted on a common axle and a further rack 16. The ratio of the diameters of the said two pinions are proportional to the ratio of the lengths of the work on each side of the ring 2 namely 1:3. The rack 16 is likewise horizontally movable in bearings 9 and is mechanically connected by rod means 18 to the other centre 5'.

When thrust is applied to the rack 16 in the direction of arrow 19 the two centres 5 and 5' are simultaneously withdrawn from the work. Due to the ratio of the diameters of the two pinions 15 the centre 5 on the left will withdraw three times as fast as the centre 5' on the right. Accordingly during the process of inductive heating of the workpiece 1, the length of the workpiece extending on the left hand side of the ring 2 can thermally expand three times as much as the length of the workpiece extending on the right hand side of the ring. The ring itself will therefore remain stationary below the recess provided in the inductor for its accommodation.

What is claimed is:

1. Apparatus for inductively heating elongate workpieces of the type comprising workpiece holding centres mounted in a casing and inductor means for inductively heating an elongate workpiece gripped thereby, the improvement which comprises connecting means mechanically rigidly interconnecting said centres for positive and simultaneous movement in a manner such that displacement of one centre is opposite and proportional to displacement of the other centre and means yieldably biasing said connecting means and said centres in a direction such that said centres are biased toward each other to maintain engagement with the workpiece.

2. Apparatus as claimed in claim 1, in which the said biasing means for each workpiece holding centre includes a compression spring located behind the said centre.

3. Apparatus as claimed in claim 1, in which said connecting means comprises a rack mechanically rigidly connected to each centre and movable parallel to the axis of the said centres, and coupling means associated with the two racks for simultaneously moving one rack in a longitudinal direction and the other rack to move in the opposite longitudinal direction.

4. Apparatus as claimed in claim 3, in which the said coupling means comprises a single pinion intercalating with the said two racks.

5. Apparatus as claimed in claim 3, in which the said coupling means comprises at least two pinions providing a gear ratio such that a predetermined portion of the length of a workpiece held between the said centres in a heating position is held stationary in relation to the heating conductor.

6. Apparatus as claimed in claim 5, in which the said coupling means comprises two pinions on a common axle rigidly fixed in relation to each other, the one pinion intercalating with one rack and the other pinion intercalating with the other rack.

7. In apparatus for inductively heating an elongate workpiece including two workpiece holding centres for engaging the opposite ends of the workpiece and induction means for inductively heating an elongate workpiece gripped by said centres, said induction means being substantially coextensive with the workpiece and shaped to conform with elevations of the workpiece, the improvement which effects stationary positioning of a position of the workpiece relative to said induction means under heating conditions where thermal expansion of the workpiece tends to displace a portion of the workpiece in an axial direction, said improvement comprising: mounting means for mounting each of said workpiece holding centres for movement toward and away from the other centre; means interconnecting said centres for positive and simultaneous differential movement toward and away from each other whereby upon thermal expansion of the workpiece in an axial direction said centres move away from each other to different extents; and means yieldably biasing said centres toward each other to maintain engagement with the workpiece.

References Cited

UNITED STATES PATENTS

| 2,076,615 | 4/1937  | Bullock  | 74—29      |
| 2,353,716 | 7/1944  | Estey    | 74—29 X    |
| 2,017,305 | 10/1935 | Campbell | 219—10.57 X |
| 2,540,700 | 2/1951  | Stivin   | 219—10.57 X |
| 2,794,894 | 6/1957  | Tudbury  | 219—10.57  |

JOSEPH V. TRUHE, Primary Examiner

L. H. BENDER, Assistant Examiner

U.S. Cl. X.R.

219—10.67